United States Patent
Martini

(10) Patent No.: US 12,353,946 B2
(45) Date of Patent: Jul. 8, 2025

(54) MULTIPATH AUTHENTICATION OF SECURITY-RELEVANT APPLICATIONS AND DEVICES

(71) Applicant: Giesecke+Devrient ePayments GmbH, Munich (DE)

(72) Inventor: Ullrich Martini, Munich (DE)

(73) Assignee: GIESECKE+DEVRIENT EPAYMENTS GMBH, Munich (DE)

(*) Notice: Subject to any disclaimer, the term of this patent is extended or adjusted under 35 U.S.C. 154(b) by 0 days.

(21) Appl. No.: 18/673,696

(22) Filed: May 24, 2024

(65) Prior Publication Data

US 2024/0394487 A1 Nov. 28, 2024

(30) Foreign Application Priority Data

May 26, 2023 (DE) .......... 102023113979.7

(51) Int. Cl.
- G06K 7/10 (2006.01)
- G06F 21/44 (2013.01)
- H04L 9/40 (2022.01)
- H04W 12/06 (2021.01)

(52) U.S. Cl.
CPC .......... *G06K 7/10366* (2013.01); *G06F 21/44* (2013.01); *H04L 63/0853* (2013.01); *H04W 12/06* (2013.01)

(58) Field of Classification Search
CPC ............... G06K 7/10366; H04W 12/06; H04L 63/0853; G06F 21/44
USPC ....................................................... 235/451
See application file for complete search history.

(56) References Cited

U.S. PATENT DOCUMENTS

| 9,184,913 B2 | 11/2015 | Froels et al. |
| 11,263,302 B2 | 3/2022 | Finkenzeller et al. |
| 2002/0040936 A1* | 4/2002 | Wentker ............... G06Q 20/341 235/492 |
| 2005/0132189 A1 | 6/2005 | Katsube et al. |

FOREIGN PATENT DOCUMENTS

| DE | 102015011076 A1 | 3/2017 |
| EP | 2749003 B1 | 6/2018 |
| EP | 2080144 B1 | 8/2018 |

OTHER PUBLICATIONS

German Search Report from corresponding DE Application No. 102023113979.7, Feb. 28, 2024.

* cited by examiner

*Primary Examiner* — Toan C Ly
(74) *Attorney, Agent, or Firm* — Workman Nydegger

(57) ABSTRACT

A method and an apparatus for multipath authentication are described. A card reader and an application executed thereon interact with a chip card. This results in a request being transmitted to the chip card. The chip card provides an identifier, e.g. a random number. The card reader initiates an attestation of the application by an attestation authority and transfers an attestation response and the identifier to a service that is to be used. The service verifies the attestation response and signs the identifier if the attestation response is valid. The signed identifier is then transferred to the card reader, which in turn transfers the signed identifier to the chip card. The chip card can then check whether the signed identifier is valid. If the signed identifier is valid, the chip card provides the application with other functions.

13 Claims, 4 Drawing Sheets

MULTIPATH AUTHENTICATION OF SECURITY-RELEVANT APPLICATIONS AND DEVICES

TECHNICAL FIELD

The invention relates to a method for interaction between a card reader and a chip card and to a card reader designed to perform a multipath authentication by accessing a chip card. The chip cards referenced here are, by way of example, chip cards that contain a microcontroller having RFID properties (Radio-Frequency Identification properties), or what are known as dual interface chip cards. The card reader may, but does not necessarily have to, be a certified secure card reader.

BACKGROUND

Card-shaped data carriers, in particular chip cards, are used in many areas, for example to perform transactions for cashless payments, as identity documents or as evidence of access permissions. Within the context of this description, such data carriers are referred to as chip cards for all applications.

A chip card comprises a card body and an integrated circuit embedded in the card body, for example in the form of a chip module having a chip. The chip module is inserted into a cavity or module opening in the card body.

Chip cards may contain an integrated electrical resonant circuit that can be used to transmit energy to electronic components of the chip card. This is generally accomplished by virtue of the resonant circuit being supplied with energy via a magnetic field. This energy can then be used to perform processing and contactless communication functions of the chip card. By way of example, chip card controllers having RFID functionality can be used. The resonant circuit is formed by a coil with an additional capacitor on the chip module.

A chip card may also be what is known as a dual interface (DI) card having corresponding functionality, some or all of the card body of the chip card being made from metal. The way in which such a card works is that a chip module is used that itself contains a coil (coil on module). This coil couples to the metal card body.

Dual interface chip cards are chip cards with which it is possible to communicate either in contact-based fashion or contactlessly. If they are used as bank cards or credit cards, they are normally in what is known as ID-I format (based on ISO 7810). The present invention is not restricted to this format, however. Contact-based communication is effected using exposed contact regions, what are known as contact pads, whereas contactless communication is generally effected using an antenna coil running inside the card body and a resonant circuit as described above. Both the contact regions and the antenna coil are connected, for example electrically conductively or inductively coupled, to an IC chip. A chip card may also be integrated in a smartphone or a portable electronic device, or can even be emulated by a smartphone or other computing device.

DE 102015011076 A1 discloses a method for protecting a transaction between a data carrier in the form of a chip card and a service provider, in which the data carrier stores a security identity that is used to retrieve from an authentication server an application identity that provides authorization to perform the transaction and is presented to the service provider. This assures the service provider that transactions can be performed only with associated data carriers.

DESCRIPTION OF THE INVENTION

The object can be considered that of increasing security for a chip card having security-related functions when an application accesses the chip card.

This object is achieved by a method and an apparatus according to the independent claims. Other embodiments are obtained from the dependent claims and from the description that follows.

According to one aspect, a method for interaction between a card reader on which an application is executed and a chip card is specified. The method comprises the following steps: transmitting, by way of the card reader, a request to the chip card; providing, by way of the chip card, an identifier; transferring the identifier from the chip card to the card reader; initiating, by way of the card reader, an attestation of the application by an attestation authority; transferring, by way of the card reader, an attestation response and the identifier to a service; checking the attestation response for validity; if the attestation response is valid: signing, by way of the service, the identifier; transferring, by way of the service, the signed identifier to the chip card; checking, by way of the chip card, a validity of the signed identifier; providing the application with functions of the chip card if the signed identifier is valid. The identifier can be produced afresh for each session, for example, in order to improve the security of the method. The method assures a chip card that an application accessing it is trusted.

Known cryptographic methods and certificates are used for the signing and attestation, for example. By way of example, the attestation responses of the attestation authority are verified by checking the validity of an applicable certificate.

The validity of the identifier is checked by the chip card, for example by virtue of the chip card bringing in the signed identifier and comparing it with the original identifier provided by the chip card. If the signature is valid and the signed identifier is identical, or corresponds, to the provided identifier, then the signed identifier is valid.

The method described here improves the resilience to attack of chip cards that are accessed by an application executed on a card reader. The card reader described in the context of this description is a computing unit designed to execute applications that access a chip card in order to perform certain security-related functions or to control access to such functions, for example by virtue of the chip card providing a signature. A chip card cannot directly check whether an application executed on the card reader is authentic, that is to say free of manipulations or falsifications. To prevent the chip card from interacting with an unauthentic application and therefore to deny an unauthentic application access to security-related functions, the chip card is incorporated into a multipath authentication.

The card reader that executes an application may fundamentally contain an attestation of its integrity or can obtain it online via an internet connection if required. Said attestation confirms that the application is trusted (free of manipulation, unfalsified). A corresponding certificate is received by the card reader, for example as part of an attestation of the application by the attestation authority, which is operated by the provider or producer of the application, or by the publisher of the execution environment of the application.

The identifier provided by the chip card (for example a one-time password such as a random number) is combined with the attestation of the application. The chip card is thus incorporated into this process. The attestation of the application and the identifier provided by the chip card are then sent to the service that a user wishes to access using the application on the card reader. The service verifies the attestation (that is to say the attestation response that relates to the application) and signs the identifier only when the attestation has been verified as valid. This means that the application is certified trusted. The signed identifier is transferred to the card reader and to the chip card. The chip card can then use verification of the signature and a comparison of the signed identifier against the original identifier to check whether the service has sent back the appropriate identifier in signed form. If this is the case, the chip card assumes that the application executed on the card reader is trusted and provides the application with access to security-related functions of the chip card.

The steps of the method are performed by the card reader or instituted by the card reader by virtue of the card reader prompting the appropriate function calls to the chip card, the attestation authority and the service.

In summary, the method can be described as follows: a card reader and an application executed thereon interact with a chip card. This results in a request to use an application being transmitted to the chip card. The chip card provides an identifier, e.g. a random number, and transfers this identifier to the card reader. The card reader initiates an attestation of the application by an attestation authority and transfers an attestation response and the identifier to a service that is to be used by the application. The service verifies the attestation response and signs the identifier if the attestation response is valid. The signed identifier is then transferred to the card reader, which in turn transfers the signed identifier to the chip card. The chip card can then check whether the signed identifier is valid. If the signed identifier is valid, the chip card provides the application with other functions. This ensures that the chip card cooperates with authentic applications and the risk of misuse of security-related functions that the chip card provides the application with is reduced. This is achieved as a result of the chip card being incorporated into the authentication process by virtue of an identifier provided by the chip card being combined with an attestation request for the application by the producer of the application. The application is attested and the identifier provided by the chip card is not signed by the service until the attestation of the application is valid.

In one embodiment, initiating the attestation of the application by the attestation authority comprises the following steps: transferring, by way of the card reader, an attestation request for the application to the attestation authority; and receiving, by way of the card reader, the attestation response provided by the attestation authority.

In another embodiment, the attestation request for the application is transferred to the attestation authority together with the identifier.

In order to attest the application, the attestation request and the attestation authority may fundamentally relate solely to the application. However, it is also conceivable for the attestation request to contain the identifier provided by the chip card and for the attestation authority to produce an attestation for combining the application with the currently used identifier. This allows the security of the method to be increased.

In another embodiment, transferring the signed identifier to the chip card comprises the following steps: transferring, by way of the service, the signed identifier to the card reader; and transferring, by way of the card reader, the signed identifier to the chip card.

The identifier signed by the service is thus not transmitted to the chip card directly. Rather, the service transmits the signed identifier to the card reader, because the latter performs or initiates the steps of the method. The card reader in turn forwards the signed identifier to the chip card.

In another embodiment, providing the identifier by way of the chip card comprises generating a random number by way of the chip card and using the random number as the identifier.

The random number can be generated dynamically if the card reader transfers a request to the chip card. Alternatively, the chip card can select an entry from a table as a one-time password and use it as the identifier. At this point, there are various conceivable approaches as to how the chip card can produce or select the identifier in order to provide the card reader with said identifier for the current process and the further processing.

In another embodiment, before the attestation response and the identifier are transferred to the service the attestation response and the identifier are combined with one another.

This can prevent the attestation response of the attestation authority that relates to the application from being used repeatedly in separate requests to the service.

In another embodiment, the validity of the signed identifier is checked by the chip card using a public key of the service.

The service normally signs the identifier by employing cryptographic methods and applying a private key to the identifier. The chip card contains the public key of the service and can thus check whether the signature is valid, that is to say whether the service has signed the original identifier and transferred it back to the card reader and the chip card.

In another embodiment, the attestation authority is a provider or producer of the application.

This means that the provider of the application confirms the authenticity of the application. This confirmation from the provider of the application is depended on by the method described here, which uses this confirmation as a basis for the assumption that the application has not been manipulated or falsified. The availability of this confirmation is a prerequisite for the chip card working together with the application, i.e. providing the application with functions.

In another aspect, a card reader is specified. The card reader is designed to interact with a chip card. The card reader comprises a processor that is designed to execute an application and, while executing the application, to transmit a request to the chip card, to receive an identifier provided by the chip card, to initiate an attestation of the application by an attestation authority, to transfer an attestation response of the attestation authority and the identifier to a service, to receive the identifier signed by the service, to transfer the signed identifier to the chip card, and to access functions of the chip card after the chip card has checked the signed identifier for validity and acknowledged the validity.

The card reader is designed to interact with the chip card using RFID technology or NFC (Near Field Communication) technology and to interchange data wirelessly. For this purpose, the card reader comprises a communication interface, for example an antenna, in order to emit electromagnetic signals in the direction of the chip card and to receive electromagnetic signals emitted by the chip card. Alternatively, the card reader can also interchange data with the chip card using a contact-based interface.

The processor is designed to perform or initiate the steps described in connection with the method. In this respect, to avoid repetition, reference is made to the description of the method.

In one embodiment, the card reader is a smartphone designed to execute the application and to access the chip card while executing the application.

In another embodiment, the processor is designed to transfer an attestation request for the application to the attestation authority and to receive an attestation response provided by the attestation authority.

In another embodiment, the processor is furthermore designed to combine the attestation response of the attestation authority and the identifier with one another before the processor transfers them to the service.

In another aspect, a system is specified. The system comprises a card reader as described herein, a chip card and a service. The application executed on the card reader accesses the service.

In one embodiment, the chip card comprises a chip module that comprises a microcontroller having RFID properties or a dual interface chip.

BRIEF DESCRIPTION OF THE FIGURES

A few details are described in more detail below with reference to the accompanying drawings. The representations are schematic and not to scale. Identical reference signs refer to identical or similar elements. In the drawings.

DETAILED DESCRIPTION

Figure 1:
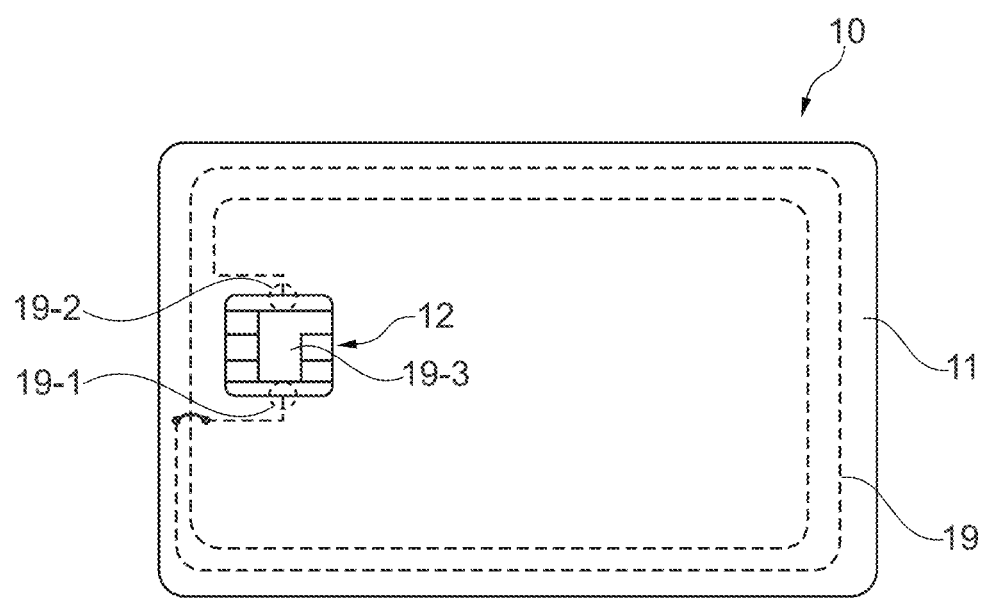
FIG. 1 shows a schematic representation of what is known as a dual interface chip card.

FIG. 1 schematically shows a plan view of a dual interface chip card 10 in ID-I format, having a card body 11. Arranged in the card body 11 of the chip card 10 are an antenna coil 19 and a chip module 12. Each of the two open ends of the antenna coil 19 has a contact terminal 19-1, 19-2, via which the antenna coil 19 is conductively connected to the chip module 12. The antenna coil 19 is used for contactless communication by an external card reader 30 (see FIG. 4) with the chip module 12. For contact-based communication with the chip module 12, the chip module 12 has a contact pad 19-3 having multiple separate contact regions.

Figure 2:
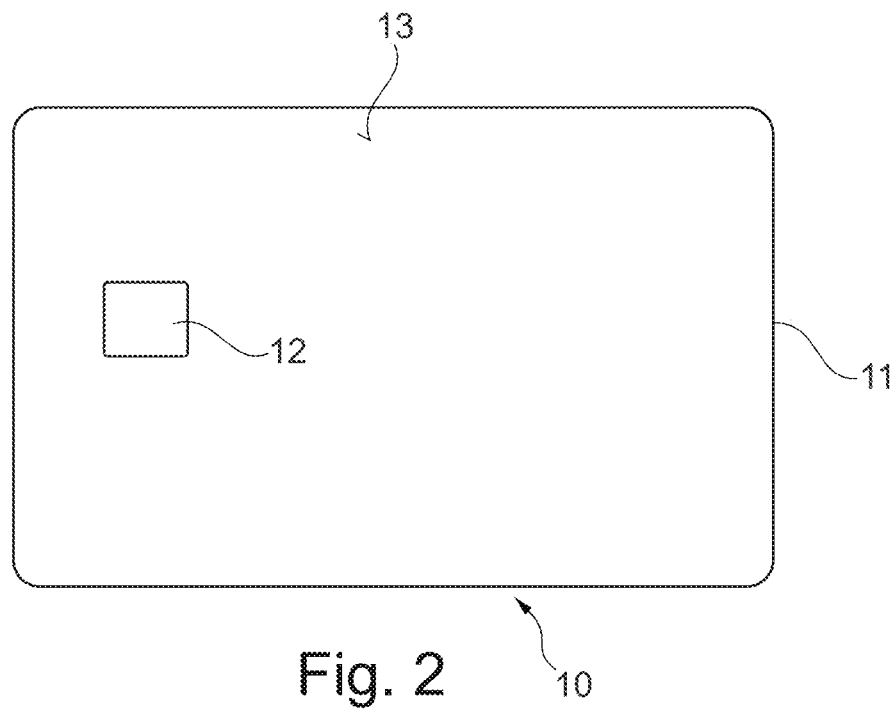
FIG. 2 shows a schematic representation of a chip card.

FIG. 2 shows a chip card 10 having a card body 11 in an alternative design. The card body 11 may be made from a plastic such as PVC, polycarbonate or the like. The card body may include a metal layer, not shown here, each of the main surfaces of which may be covered with a plastic layer. A metal layer may be present for example in the form of a core or a layer of a stainless steel alloy, for example having a thickness of 400 µm. The thickness of the card body 11 may be between 50 µm and 920 µm, for example.

The chip card 10 includes a chip module 12 inserted in a main surface 13 of the card body 11 or of the chip card 10.

The chip module 12 may be inserted in a module opening or cavity. The cavity may include a central blind hole and a peripheral edge region. Here, the cavity is concealed by the inserted chip module 12. The chip module 12 may be adhesively bonded in the cavity or mounted in another way, for example held therein by a clamping force.

The chip module 12 contains a coil 16. The coil 16 normally comprises a plurality of turns, for example approximately 12 to 16 turns. The turns run for example concentrically around a chip or an electronic circuit of the chip module 12. The width of a turn may be 50 µm to 70 µm and the distance between two turns may be 100 µm. The turns may have copper thicknesses up to approximately 30 µm.

The chip may be implemented for example in the form of an integrated circuit and is mounted for example in a potting compound on an underside of the chip module 12. The coil is used to supply the integrated circuit with energy and/or signals. As such, an electromagnetic field can be coupled into the coil. By way of example, the integrated circuit may be or contain a chip card controller having RFID functionality.

Figure 3:
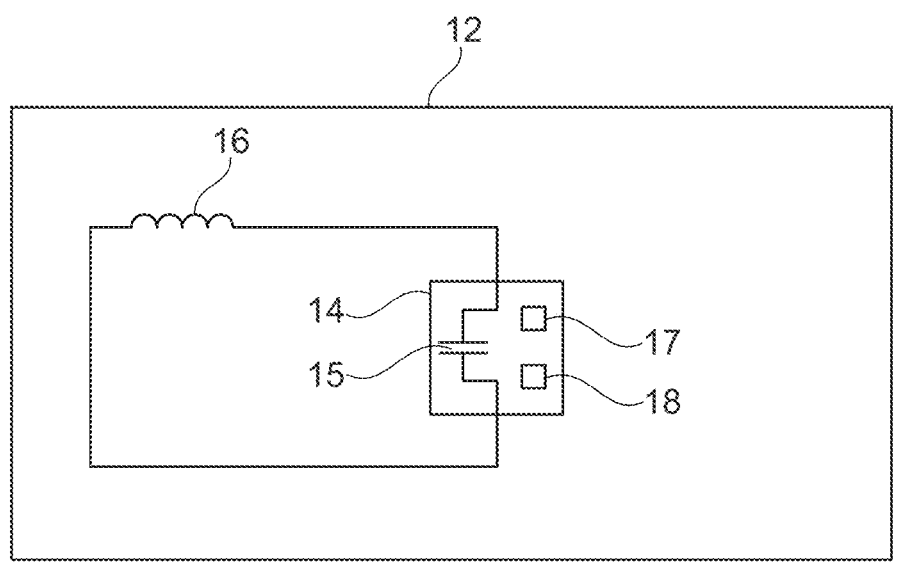
FIG. 3 shows a schematic representation of a chip module.

FIG. 3 shows an equivalent circuit diagram of the chip module 12 of the chip card 10. The chip module 12 includes the integrated circuit 14, for example in the form of a chip. The integrated circuit 14 may be soldered on the chip module 12, for example, or may have been put onto the chip module 12 using flip chip assembly. The integrated circuit 14 contains a card controller for the chip card 10. The integrated circuit 14 normally contains a processor 17 for performing control functions for the chip card 10 and for the communication and for performing computing operations for example for security functions. Moreover, the integrated circuit 14 contains a memory area 18 for storing and/or providing data.

The integrated circuit 14 furthermore contains a capacitor 15 having a suitable capacitance that influences the resonant frequency of the resonant circuit. The capacitance is in the range of a few pF, for example 78 pF. The coil 16 is connected in parallel with the integrated circuit 14.

The coil 16 and the capacitor 15 of the integrated circuit 14 form a resonant circuit. This resonant circuit can be used by the chip module 12 to communicate with a reader (for example a card reader) that is external to the chip card 10, with a production machine or else with a measuring device. The reader uses an electromagnetic field to introduce energy into the coil 16, as a result of which the integrated circuit 14 is activated and operated. The function of the coil 16 corresponds to the function of the antenna coil 19 from FIG. 1.

The integrated circuit 14 has a processor 17, the operating speed or computing power of which is dependent on the level of the applied field strength. From a minimum electromagnetic field strength upward, the processor 17 and also the integrated circuit 14 start to operate. As field strength increases, the operating frequency of the processor 17 and the integrated circuit 14 and therefore the processing speed rise. From a cutoff frequency onward, no further rise in operating frequency takes place. The processor 17 and also the integrated circuit 14 are at saturation and operate at maximum frequency.

The processor 17 performs computing operations in order to provide a function for an application on the card reader, for example a signature that the application can use to access protected data or services. The signature may be stored in the memory 18, and the processor 17 accesses the latter when the application on the card reader has authenticated itself.

The chip card 10 may be what is known as a DI card, having a high-quality connection technology between the integrated circuit 14 and the coil 16. This is preferably either a soldered connection or a welded connection.

Moreover, this chip card 10 may be equipped with an operating system (OS) that can receive and transmit data at a predefined carrier frequency, for example of 13.56 MHz.

Figure 4:
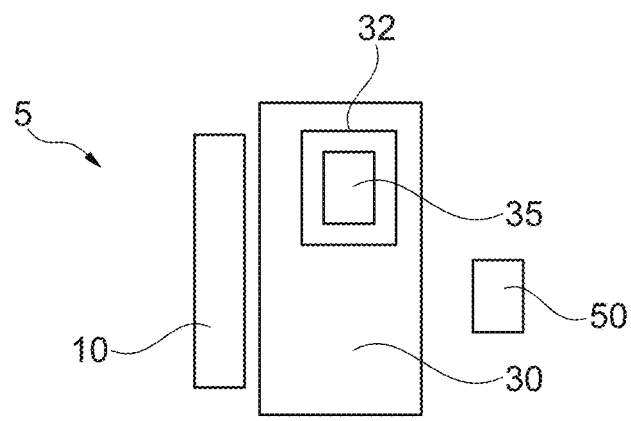
FIG. 4 shows a schematic representation of a system having a card reader.

FIG. 4 shows a system 5 having a card reader 30, a chip card 10 and a service 50. The card reader 30 comprises a processor 32. The processor 32 executes an application 35.

The application 35 accesses the chip card 10 in order to use the functions provided by the chip card 10 to access the service 50.

Figure 5:
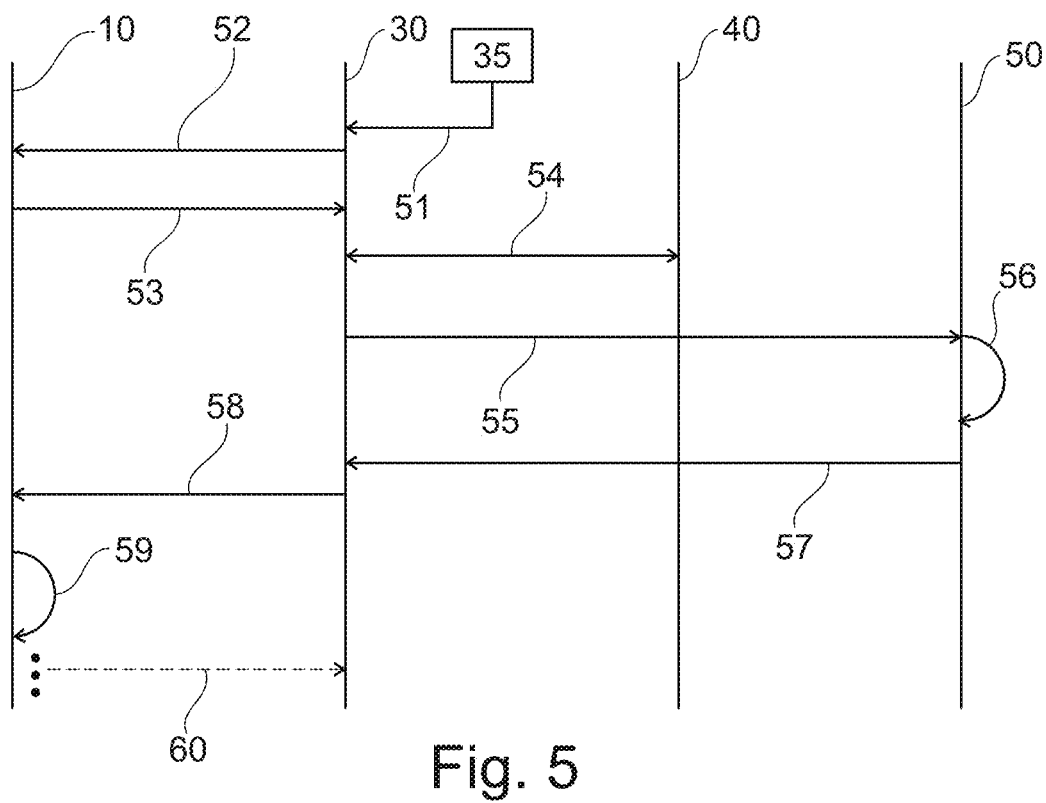
FIG. 5 shows a schematic representation of the interaction between a card reader, a chip card, an attestation authority and a service.

FIG. 5 shows the interactions between the application 35 that is executed on the card reader 30, the chip card 10, the attestation authority 40 and the service 50.

The starting point is an action in the application 35 that brings about a user input 51. The card reader 30 receives the user input 51 from the application 35 and recognizes that performance of the function called for by the user input requires the chip card 10 to be accessed, in order to initiate a function provided by the chip card 10, for example accessing a signature. To cause the function to be performed, the card reader 30 generates a request 52 to the chip card 10 and transfers this request 52 to the chip card.

Before the chip card 10 executes commands for performing the requested function, a check is carried out to determine whether the application 35 can be trusted by the chip card 10 and is in the state intended by the publisher of the function.

In response to the request 52, the chip card 10 generates an identifier, for example in the form of a random number, and transfers the identifier to the card reader 30 using a message 53. The card reader 30 then institutes an attestation 54 by the attestation authority or the provider 40 of the application 35 by transferring an appropriate request to the attestation authority 40. The card reader 30 then receives an attestation response from the attestation authority 40. This attestation response is transmitted by the card reader 30 to the service 50 in step 55, together with the identifier provided by the chip card 10. At 56, the service 50 verifies the attestation of the application 35. This can be accomplished by virtue of the service 50 using known cryptographic mechanisms. If the service 50 considers the attestation of the application 35 to be valid, the service 50 signs the identifier of the chip card and transmits the signed identifier to the card reader 30 in step 57. The card reader 30 in turn transmits the signed identifier on to the chip card 10 in step 58. By way of example, the chip card 10 can use the public key of the service 50 to check in step 59 whether the signed identifier matches the identifier originally provided by the chip card 10 in step 53. If this is the case, the chip card 10 grants the application 35 access to other functions, for which step 60 is shown in representative fashion.

This approach incorporates the chip card 10 into the multipath authentication, and it is ensured that only an authenticated and unfalsified application 35 is provided with access to security-related functions of the chip card 10.

Figure 6:
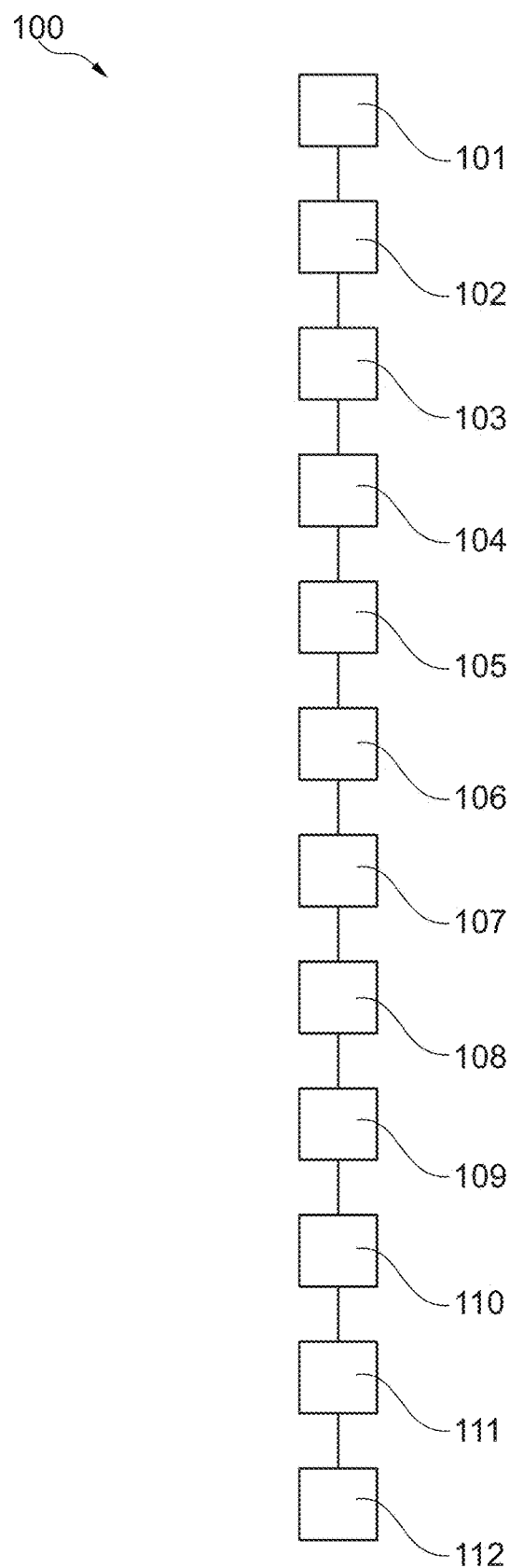
FIG. 6 shows a schematic representation of the steps of a method for interaction between a card reader on which an application is executed and a chip card.

FIG. 6 shows a schematic representation of the steps of a method 100 for interaction between a card reader 30 on which an application 35 is executed and a chip card 10. The method 100 comprises the following steps: in a step 101, a request is transmitted to the chip card 10 by the card reader 30; in a step 102, an identifier is provided by the chip card 10; in a step 103, the identifier is transferred from the chip card 10 to the card reader 30; in a step 104, an attestation request for the application 35 is transferred to the attestation authority 40 by the card reader 30; in a step 105, the attestation response provided by the attestation authority 40 is received by the card reader 30; in a step 106, an attestation response and the identifier are transferred to a service 50 by the card reader 30; in a step 106, the attestation response is checked for validity by the service 50; the following steps are performed according to whether the attestation response is valid and the application has been attested valid: in a step 108, the identifier is signed by the service 50; in a step 109, the signed identifier is transferred to the card reader 30 by the service 50; in a step 110, the signed identifier is transferred to the chip card 10 by the card reader; in a step 111, a validity of the signed identifier is checked by the chip card 10; and in a step 112, the application 35 is provided with functions of the chip card 10 if the signed identifier is valid.

The examples shown describe how the service 50 checks the attestation response of the attestation authority. However, it is also conceivable for the chip card 10 to check the attestation response of the attestation authority 40. In the latter case, the chip card 10 would need to have appropriate computing power in order to be able to perform functions such as key management and signature format. It may therefore be advantageous if the checking of the attestation response is performed by the service 50.

If the attestation response of the attestation authority 40 is not valid, the service 50 does not acknowledge the attestation as valid and the identifier of the chip card is not signed by the service and also not returned to the card reader. The whole process is thus aborted after a predefined period of time has elapsed, and the application 35 is not provided with access to the security-relevant functions of the chip card 10, i.e. the process is aborted even before step 60 from FIG. 5.

Similarly, the chip card 10 does not provide the application 35 with access to the security-relevant functions (from step 60 onward in FIG. 5) if in step 58 the signed identifier received by the chip card 10 does not correspond to the originally provided identifier from step 53.

It should additionally be pointed out that "including" or "comprising" does not preclude other elements or steps and "a" or "an" does not preclude a multiplicity. Furthermore, it will be pointed out that features or steps that have been described with reference to one of the above exemplary embodiments can also be used in combination with other features or steps of other exemplary embodiments described above. Reference signs in the claims should not be regarded as a restriction.

The invention claimed is:

1. A method for interaction between a card reader on which an application is executed and a chip card, the method comprising the following steps:
   transmitting, by way of the card reader, a request to the chip card;
   providing, by way of the chip card, an identifier;
   transferring the identifier from the chip card to the card reader;
   initiating, by way of the card reader, an attestation of the application by an attestation authority;
   transferring, by way of the card reader, an attestation request for the application to the attestation authority;
   receiving, by way of the card reader, an attestation response provided by the attestation authority;
   transferring, by way of the card reader, the attestation response and the identifier to a service;
   checking the attestation response for validity;
   if the attestation response is valid:
   signing, by way of the service, the identifier;

transferring, by way of the service, the signed identifier to the chip card;
checking, by way of the chip card, a validity of the signed identifier;
providing the application with functions of the chip card if the signed identifier is valid.

2. The method as claimed in claim 1,
wherein the attestation request for the application is transferred to the attestation authority together with the identifier.

3. The method as claimed in claim 1,
wherein transferring the signed identifier to the chip card comprises the following steps:
transferring, by way of the service, the signed identifier to the card reader;
transferring, by way of the card reader, the signed identifier to the chip card.

4. The method as claimed in claim 1,
wherein providing the identifier by way of the chip card comprises:
generating a random number by way of the chip card and using the random number as the identifier.

5. The method as claimed in claim 1,
wherein before the attestation response and the identifier are transferred to the service the attestation response and the identifier are combined with one another.

6. The method as claimed in claim 1,
wherein the validity of the signed identifier is checked by the chip card using a public key of the service.

7. The method as claimed in claim 1,
wherein the attestation authority is a provider of the application.

8. A card reader designed to interact with a chip card, the card reader comprising a processor that is designed to execute an application and, while executing the application:
to transmit a request to the chip card;
to receive an identifier provided by the chip card;
to initiate an attestation of the application by an attestation authority;
to transfer an attestation response of the attestation authority and the identifier to a service;
to receive the identifier signed by the service;
to transfer the signed identifier to the chip card;
to access functions of the chip card after the chip card has checked the signed identifier for validity and acknowledged the validity.

9. The card reader as claimed in claim 8,
wherein the card reader is a smartphone designed to execute the application and to access the chip card while executing the application.

10. The card reader as claimed in claim 9,
wherein the processor is furthermore designed:
to transfer an attestation request for the application to the attestation authority;
to receive an attestation response provided by the attestation authority.

11. The card reader as claimed in claim 8,
wherein the processor is furthermore designed:
to combine the attestation response of the attestation authority and the identifier with one another before the processor transfers them to the service.

12. A system comprising:
a card reader as claimed in claim 9;
a chip card;
a service that the application executed on the card reader accesses.

13. The system as claimed in claim 12,
wherein the chip card comprises a chip module that comprises a microcontroller having RFID properties or a dual interface chip.

* * * * *